United States Patent
Kia et al.

(10) Patent No.: US 10,941,510 B2
(45) Date of Patent: Mar. 9, 2021

(54) EQUIPMENT FOR PERFORATED PRE-IMPREGNATED REINFORCEMENT MATERIALS

(71) Applicant: GM Global Technology Operations LLC, Detroit, MI (US)

(72) Inventors: Hamid G. Kia, Bloomfield Hills, MI (US); Selina X. Zhao, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 332 days.

(21) Appl. No.: 15/836,315

(22) Filed: Dec. 8, 2017

(65) Prior Publication Data
US 2019/0177893 A1    Jun. 13, 2019

(51) Int. Cl.
*D06B 1/14*      (2006.01)
*B29B 15/10*     (2006.01)
(Continued)

(52) U.S. Cl.
CPC .............. *D06B 1/14* (2013.01); *B29B 15/105* (2013.01); *B29C 70/42* (2013.01); *B29C 70/545* (2013.01);
(Continued)

(58) Field of Classification Search
CPC ...... D06B 1/14; D06B 23/042; B29C 70/545; B29C 2793/0045; B23D 29/002;
(Continued)

(56) References Cited

U.S. PATENT DOCUMENTS

| | | | |
|---|---|---|---|
| 3,458,615 A | 7/1969 | Bragaw, Jr. et al. | |
| 3,699,210 A | 10/1972 | Binning et al. | |

(Continued)

FOREIGN PATENT DOCUMENTS

| | | |
|---|---|---|
| CN | 101600550 A | 12/2009 |
| CN | 102965928 A | 3/2013 |

(Continued)

OTHER PUBLICATIONS

Second Office Action for Chinese Patent Application No. 201610771305.1 dated Mar. 11, 2019 with English language machine translation, 9 pages.

(Continued)

*Primary Examiner* — Omar Flores Sanchez
(74) *Attorney, Agent, or Firm* — Harness, Dickey & Pierce, P.L.C.

(57) ABSTRACT

An apparatus for perforating a carbon fiber substrate material comprises a support structure including a first side support and a second side support and a cylindrical anvil rotatably connected between the first side support and the second side support. The anvil is configured to move the carbon fiber substrate material in response to rotation of the anvil. The apparatus further comprises a cylindrical cutting wheel rotatably connected to the support structure between the first side support and the second side support and positioned adjacent to the anvil. The cutting wheel includes a plurality of blades projecting outward from an outer surface of the cutting wheel wherein the blades of the cutting wheel are configured to perforate the carbon fiber substrate material when the carbon fiber substrate material moves between the anvil and the cutting wheel.

18 Claims, 11 Drawing Sheets

(51) Int. Cl.
*B29C 70/54* (2006.01)
*B29C 70/42* (2006.01)
*D06B 23/04* (2006.01)

(52) U.S. Cl.
CPC .... *D06B 23/042* (2013.01); *B29C 2793/0045* (2013.01)

(58) Field of Classification Search
CPC ...... B23D 29/023; B23D 15/04; B23D 15/12; B23D 15/105
See application file for complete search history.

(56) References Cited

U.S. PATENT DOCUMENTS

| | | | |
|---|---|---|---|
| 4,208,267 A | 6/1980 | Diefendorf et al. | |
| 4,672,705 A * | 6/1987 | Bors | D06B 1/14 118/246 |
| 4,737,383 A * | 4/1988 | Matsumae | B05C 3/125 118/419 |
| 5,017,423 A * | 5/1991 | Bossmann | B29C 59/16 442/327 |
| 5,024,818 A | 6/1991 | Tibbetts et al. | |
| 5,194,212 A | 3/1993 | Bonnett | |
| 5,582,912 A | 12/1996 | McCullough, Jr. et al. | |
| 5,916,346 A * | 6/1999 | Neal | B26D 7/20 83/347 |
| 6,638,883 B2 | 10/2003 | Gaffney et al. | |
| 8,191,215 B2 | 6/2012 | Meyer | |
| 8,309,644 B1 | 11/2012 | Huang | |
| 8,567,469 B2 | 10/2013 | Meyer et al. | |
| 8,568,549 B2 * | 10/2013 | Meyer | B29B 11/16 156/256 |
| 9,896,783 B2 | 2/2018 | Kia | |
| 9,920,454 B2 | 3/2018 | Sutti et al. | |
| 9,956,712 B2 | 5/2018 | Lanzl et al. | |
| 10,113,250 B2 | 10/2018 | Kia | |
| 10,358,767 B2 | 7/2019 | Kia et al. | |
| 10,427,349 B2 | 10/2019 | Kia et al. | |
| 10,612,163 B2 | 4/2020 | Kia et al. | |
| 2003/0100239 A1 | 5/2003 | Gaffney et al. | |
| 2004/0089129 A1 | 5/2004 | Toth | |
| 2010/0028593 A1 | 2/2010 | Taketa et al. | |
| 2012/0213997 A1* | 8/2012 | Wang | B29C 70/12 428/398 |
| 2013/0149523 A1 | 6/2013 | Tsotsis | |
| 2014/0264985 A1 | 9/2014 | Sutti et al. | |
| 2016/0194468 A1 | 7/2016 | Ogasawara et al. | |
| 2017/0067186 A1 | 3/2017 | Kia | |
| 2017/0314668 A1 | 11/2017 | Kia et al. | |
| 2018/0016740 A1 | 1/2018 | Kia et al. | |
| 2018/0085991 A1 | 3/2018 | Kia et al. | |
| 2019/0062955 A1 | 2/2019 | Kia et al. | |
| 2019/0177893 A1 | 6/2019 | Kia et al. | |

FOREIGN PATENT DOCUMENTS

| | | |
|---|---|---|
| CN | 104024494 A | 9/2014 |
| CN | 104441678 A | 3/2015 |
| CN | 105793019 A | 7/2016 |
| CN | 106521716 A | 3/2017 |
| CN | 106521718 A | 3/2017 |
| CN | 107618194 A | 1/2018 |
| CN | 107866985 A | 4/2018 |
| CN | 109423703 A | 3/2019 |
| DE | 3540411 A1 | 5/1987 |
| DE | 19944164 A1 | 6/2000 |
| DE | 102007012607 A1 | 9/2008 |
| DE | 102007012609 A1 | 9/2008 |
| DE | 102007012608 A1 | 10/2008 |
| DE | 102016116053 A1 | 3/2017 |
| DE | 102016116662 A1 | 3/2017 |
| DE | 102017115451 A1 | 1/2018 |
| DE | 102017121837 A | 3/2018 |
| DE | 102018120626 A1 | 2/2019 |
| EP | 2127840 A1 | 12/2009 |
| EP | 1305268 B1 | 9/2010 |
| EP | 2679619 A1 | 1/2014 |
| EP | 2862971 A1 | 4/2015 |
| GB | 2373793 A | 10/2002 |
| JP | 2001-73230 A | 3/2001 |
| JP | 2004345154 A | 12/2004 |
| JP | 2013082229 A | 5/2013 |
| WO | WO-2014100127 A1 | 6/2014 |

OTHER PUBLICATIONS

First Office Action for Chinese Patent Application No. 201710846713.3 dated Jun. 27, 2019 with correspondence dated Jul. 2, 2019 from China Patent Agent (H.K.) Ltd. summarizing contents, 8 pages.

U.S. Appl. No. 15/211,814, filed Jul. 15, 2016, Kia et al.

First Office Action for German Patent Application No. 102017115451.5 dated May 18, 2018 and correspondence dated May 28, 2018 from Manitz, Finsterwald & Partner summarizing contents; 5 pages.

First Office Action for Chinese Patent Application No. 201610771305.1 dated Jun. 12, 2018 with English language machine translation, 9 pages.

First Office Action for Chinese Patent Application No. 201610743811.X dated Jun. 21, 2018 with English language machine translation, 9 pages.

("Hollow." Merriam webster, www.merriam-webster.com/dictionary/hollow. 2018.) (Year: 2018).

First Office Action for Chinese Patent Application No. 201710492904.4 dated Jan. 18, 2019 with correspondence dated Feb. 11, 2019 from China Patent Agent H.K. Ltd. summarizing contents, 9 pages.

First Office Action for German Patent Application No. 102017121837.8 dated Oct. 4, 2018 and correspondence dated Oct. 17, 2018 from Manitz, Finsterwald & Partner summarizing contents; 6 pages.

Hamid G. Kia et al.; U.S. Appl. No. 15/141,361, filed Apr. 28, 2016 entitled "Linear Expansion Reduction of Metal Component Assemblies Using Composites"; 41 pages.

Hamid G. Kia et al.; U.S. Appl. No. 15/274,280, filed Sep. 23, 2016 entitled "Components Molded With Moldable Carbon Fiber and Methods of Manufacturing Thereof"; 45 pages.

Hamid G. Kia et al.; U.S. Appl. No. 15/685,157, filed Aug. 24, 2017 entitled "Modification of Continuous Carbon Fibers During Precursor for Composites Having Enhanced Moldability"; 40 pages.

First Office Action for German Application No. 102016116053.9 from the German Patent Office dated Aug. 29, 2017 and correspondence from Manitz, Finsterwald & Partner summarizing the First Office Action, 6 pages.

First Office Action for German Application No. 102016116662.6 from the German Patent Office dated Aug. 30, 2017 and correspondence from Manitz, Finsterwald & Partner summarizing the First Office Action, 6 pages.

Cytec Industries Inc.; Safety Data Sheet for VTM® 264 Prepreg; Aug. 5, 2013; 9 pages.

Cytec Industrial Materials; VTM® 264-1 & VTM® 264S-1; PDS1268_07.13._Issue1a; Jul. 17, 2013; 3 pages.

Park, Soon-Jin, et al., "Precursors and Manufacturing of Carbon Fibers," Springer Series in Materials Science, vol. 210 (Oct. 9, 2014); pp. 31-66.

Polyacrylonitrile (PAN) Carbon Fibers Industrial Capability Assessment, OUSD (AT&L) Industrial Policy, U.S. Department of Defense (Oct. 2005); 23 pages.

Technical Data Sheet, "Polyacrylonitrile (PAN): how is it made?", Toray Carbon Fibers Europe, downloaded from http://www.toray-cfe.com/index.php/en/newsletter-v2/42-product/48-polyacrylonitrile-pan-how-is-it made, (published on or before Aug. 14, 2015); 2 pages.

* cited by examiner

EQUIPMENT FOR PERFORATED PRE-IMPREGNATED REINFORCEMENT MATERIALS

GOVERNMENT SUPPORT

This invention was made with government support under Defense Advanced Research Projects Agency (DARPA) Grant No. HR0011-C-16-2-0048 awarded by the U.S. Department of Defense. The Government has certain rights in the invention.

INTRODUCTION

This section provides background information related to the present disclosure which is not necessarily prior art.

The present disclosure relates to equipment for manufactured perforated pre-impregnated reinforcing substrates used in composite materials.

Carbon fibers are used as a light-weight reinforcement phase to make high-strength light-weight polymeric composite materials. The carbon fibers may be continuous filaments that may be thousands of micrometers (μm) or millimeters (mm) in length. Alternatively, carbon fiber bundles may be chopped or milled and thus form short segments of carbon fibers. While composites incorporating carbon fibers are all light-weight and high-strength, composites incorporating continuous carbon fiber filaments have especially high strength as compared to composites incorporating chopped or milled carbon fibers.

Composite articles or components can be formed by using sheets or strips of a reinforcement material, such as a carbon fiber-based material having continuous carbon fibers. Polymer precursors, such as resins, can be impregnated in carbon fiber-based substrate material systems, known as pre-impregnating (referred to as "pre-preg") that involves wetting a resin into the carbon fiber-based substrate material in a first step, then optionally winding up the carbon fiber-based substrate material, and storing it for later use.

While the ultrahigh strengths associated with carbon-fiber composites are highly desirable in certain applications, one challenge in using continuous carbon fibers composite pre-pregs is the lack of flowability and formability, because composite pre-pregs incorporating continuous carbon fibers can be too stiff having high resistance to flow. Such inflexibility and rigidity can translate to poor moldability, making it difficult to form three-dimensional shapes from composites having continuous carbon fibers. Further, lack of flowability in the pre-preg material can result in warpage in the final composite product and issues with undesirable surface appearance. It would be desirable to form continuous carbon fiber pre-preg materials having higher flowability, and thus greater moldability, with the capability of readily forming complex and three-dimensionally shaped components with ultrahigh-strengths.

SUMMARY

This section provides a general summary of the disclosure, and is not a comprehensive disclosure of its full scope or all of its features.

In various aspects, the present disclosure provides an apparatus for perforating a carbon fiber substrate material. The apparatus comprises a support structure including a first side support and a second side support and a cylindrical anvil rotatably connected between the first side support and the second side support. The anvil is configured to move the carbon fiber substrate material in response to rotation of the anvil. The apparatus further comprises a cylindrical cutting wheel rotatably connected to the support structure between the first side support and the second side support and positioned adjacent to the anvil. The cutting wheel includes a plurality of blades projecting outward from an outer surface of the cutting wheel wherein the blades of the cutting wheel are configured to perforate the carbon fiber substrate material when the carbon fiber substrate material moves between the anvil and the cutting wheel.

In one aspect, the anvil includes an outer layer and a core. The outer layer comprises an elastomeric material and the core comprises a metal. The outer layer is wrapped around the core and is configured to grip the carbon fiber substrate material to move the carbon fiber substrate material through the apparatus.

In one aspect, the apparatus further comprises a motor coupled to the anvil that is configured to rotate the anvil.

In one aspect, the cutting wheel comprises an outer circumferential surface that defines a plurality of axial channels spaced apart from one another around the cutting wheel and a plurality of blades wherein each blade of the plurality of blades is positioned inside a channel of the plurality of channels. The cutting wheel further comprises a plurality of springs wherein each spring of the plurality of springs is positioned adjacent to each blade of the plurality of blades inside the plurality of channels to retain the plurality of blades inside the plurality of channels.

In one aspect, each blade of the plurality of blades has the same profile that includes one or more projections that project radially outward from the plurality of channels, the one or more projections configured to perforate the carbon fiber substrate material.

In one aspect, the apparatus further comprises at least one air cylinder connected to the support structure and to the cutting wheel and the at least one air cylinder is configured to move the cutting wheel toward and away from the anvil.

In one aspect, the air cylinder is adjustably connected to a source of compressed air such that the cutting wheel can be adjusted to contact the carbon fiber substrate material against the anvil whereby the plurality of blades perforates the carbon fiber substrate material.

In one aspect, the apparatus further comprises a first air cylinder connected to a first end of the cutting wheel and a second air cylinder connected to a second end of the cutting wheel. The first air cylinder and the second air cylinder are configured to adjustably move the cutting wheel relative to the anvil such that the carbon fiber substrate material is compressed between the plurality of blades of the cutting wheel and the anvil to perforate the carbon fiber substrate material.

In one aspect, the apparatus further comprises a winder connected to the support structure between the first side support and the second side support. The winder includes a cylindrical spool configured to collect the carbon fiber substrate material after the carbon fiber substrate material is perforated.

In one aspect, the spool is mechanically coupled to the anvil to cause the spool to rotate during operation to collect the carbon fiber substrate material after the carbon fiber substrate material is perforated.

In one aspect, the winder includes a clutch mechanism coupled to the spool. The clutch mechanism adjustably couples the anvil to the spool to drive the spool at a maximum rotational speed that is proportional to a rotational speed of the anvil such that an adjustable torque is exerted on the spool to maintain tension on the carbon fiber substrate material.

In one aspect, the apparatus further comprises a connecting assembly mechanically coupling the anvil to the winder. The connecting assembly includes a first sprocket, a second sprocket, a third sprocket, a fourth sprocket and a chain. The first sprocket is connected to the anvil. The second and third sprocket are connected to the second side support and the fourth sprocket is connected to the clutch mechanism. The chain mechanically couples the first sprocket, the second sprocket, the third sprocket and the fourth sprocket and causes the fourth sprocket to rotate in an opposite rotational direction from a rotational direction of the first sprocket.

In certain aspects, the present disclosure provides another example apparatus for perforating a carbon fiber substrate material. The apparatus comprises a support structure that includes a first side support and a second side support and at least one dispensing roller rotatably connected to the support structure between the first side support and the second side support. The at least one dispensing roller is configured to support a roll of the carbon fiber substrate material thereon and to permit the roll of the carbon fiber substrate material to rotate as the carbon fiber substrate material is dispensed from the roll. The apparatus further comprises a winder supported between a first side support and a second side support. The winder includes a cylindrical spool configured to collect the carbon fiber substrate material from the roll. The apparatus also includes a cylindrical cutting wheel rotatably connected to the support structure between the first side support and the second side support between the at least one dispensing roller and the winder. The cutting wheel includes a plurality of blades projecting outward from an outer surface of the cutting wheel to perforate the carbon fiber substrate material as the carbon fiber substrate material moves past the cylindrical cutting wheel from the roll to the spool.

In one aspect, the support structure further includes a rear cross-member and a top support. The rear cross-member and the top support are horizontally connected between the first side support and the second side support.

In one aspect, the apparatus further comprises an anvil connected to the support structure between the first side support and the second side support and a drive assembly configured to rotate the anvil to move the carbon fiber substrate material. The drive assembly includes a motor, a first gear, a second gear and a chain. The first gear is rotatably connected to the motor. The second gear is connected to the anvil. The chain mechanically couples the first gear to the second gear whereby rotation of the motor causes the anvil to rotate.

In one aspect, the apparatus comprises at least two dispensing rollers positioned parallel to one another below the cutting wheel and the winder.

In one aspect, the apparatus further comprises a cylindrical retention roller removably positioned between the first side support and the second side support in a first vertical slot in the first side support and in a second vertical slot in the second side support. The retention roller is configured to contact a top of the roll of carbon fiber substrate material to limit movement of the roll of carbon fiber substrate material relative to the support structure.

In one aspect, the first side support and the second side support are separated by at least 24 inches to permit a roll of carbon fiber substrate material with a width of 24 inches to be received therein.

In one aspect, the cutting wheel is removably connected to the support structure between the first side support and the second side support.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
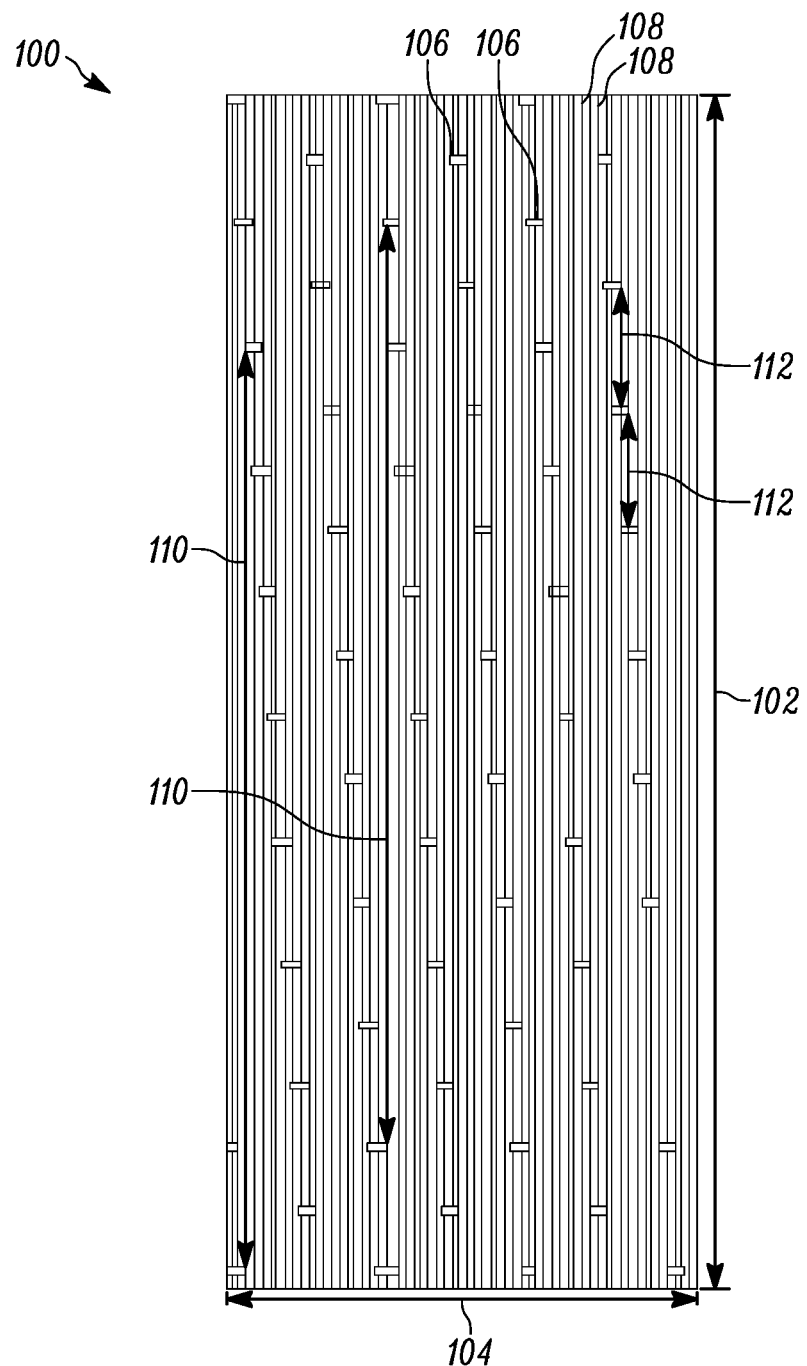
FIG. 1 is an illustration of an example perforated carbon fiber substrate material for forming a carbon fiber pre-preg composite material prepared in accordance with certain aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise.

The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Carbon-fiber reinforced polymeric composites (CFRP) comprise a resin that is cured and/or solidified to form a polymeric matrix having a plurality of carbon fibers distributed therein as a reinforcement phase. As discussed above, CFRPs are often created from a pre-preg, where bundles of the carbon fibers are used in sheets that are impregnated with uncured or partially cured resin. A component or part can be formed by using the pre-preg to be laid-up on a mandrel or disposed in a mold, where it is then consolidated and cured/reacted to form the final component.

As noted above, polymeric composites incorporating bundles of continuous carbon fibers are high-strength and light-weight; however, it can be difficult to make such materials into complex three-dimensional shaped components. One example carbon fiber pre-impregnated composite precursor material (or carbon fiber substrate material) includes bundles of continuous carbon fibers, which can have a length of greater than or equal to about 2 inches prior to treatment, as compared to pre-pregs having chopped or milled carbon fibers. The example pre-preg substrate material can have continuous carbon fibers with lengths of greater than or equal to about 2 inches, greater than or equal to about 3 inches, greater than or equal to about 4 inches, greater than or equal to about 5 inches, greater than or equal to about 6 inches, greater than or equal to about 7 inches, greater than or equal to about 8 inches, greater than or equal to about 9 inches, greater than or equal to about 10 inches, greater than or equal to about 11 inches, and in other variations, greater than or equal to about 12 inches (or 1 foot). These continuous carbon fiber polymeric composites have very high strengths and high stiffness (with high elastic modulus levels). However, without further manipulation, such continuous carbon fiber polymeric composites are not readily made into contoured or complex three-dimensionally shaped parts and potentially suffer from warpage and surface appearance issues.

Two techniques can be used to form complex shaped parts from continuous carbon fiber composites, but both may potentially suffer from certain drawbacks. The first technique incorporates continuous carbon fibers into a composite sheet having continuous unidirectional carbon fibers, but then divides the larger composite sheet into multiple smaller pieces (either as a pre-preg or just before application to form the component). The smaller cut pieces are then assembled so that the edges of adjacent pieces overlap in a manual layup process to create a larger structure. The smaller pieces thus have hundreds of thousands of continuous carbon fiber filaments (e.g., cut bundles) that terminate on the same cut line(s). While the smaller pieces can be laid up to create more complex shapes and contours, this technique may produce a composite with relatively reduced part strength because of the unidirectional carbon fiber filaments all end along the same cut line. Even though the cut pieces overlap, there remain various loci or regions for stress propagation and fracture throughout the composite along the cut lines that reduces overall strength.

Alternatively, in another technique, the carbon fiber bundles may be chopped or milled into shorter fiber segments, typically with a maximum length of less than about 2 inches, prior to be incorporated into a pre-preg material. Each bundle may have approximately 50,000 filaments (e.g., 50K tow), by way of example. When carbon fibers are chopped, a tow of continuous carbon fibers is cut across an entire width of the tow, so that a continuous clean cut occurs at predetermined distances. Typically the chopped fibers are distributed in a random orientation homogenously within the pre-preg or composite as an isotropic reinforcement phase. However, the short chopped fibers are discontinuous and provide open regions between distinct fibers for stress and crack propagation through the resin/polymeric matrix. While still providing high strengths, chopped carbon fiber composites typically have lower strengths than continuous carbon fiber composites, often an order of magnitude less.

In certain aspects, the present technology provides devices and related methods for improving moldability and flowability, while reducing warpage, in components formed from carbon fiber pre-impregnated composite precursor materials that include bundles of continuous carbon fibers as a reinforcement phase and a polymer material precursor. In certain aspects, the method involves introducing discontinuous cuts in the carbon fiber pre-impregnated composite precursor material, which helps to improve moldability and reduce stiffness and warpage, as compared to conventional continuous fiber pre-pregs.

In certain aspects, the present disclosure contemplates using an apparatus with a cutting wheel that introduces discontinuous perforations in the carbon fiber substrate material that forms a carbon fiber pre-preg composite precursor material. The apparatus can quickly and reliably introduce the perforations into a length of the carbon fiber substrate material.

Referring now to FIG. 1, one example pattern of a perforated carbon fiber substrate material for forming a carbon fiber pre-preg composite material is shown. An example length of perforated carbon fiber substrate material 100 can have a length 102 and a width 104. The carbon fiber filaments extend length-wise along the length 102 of the carbon fiber substrate material that will form a carbon fiber pre-preg composite material. A plurality of apertures or perforations 106 are made in the carbon fiber substrate material. The plurality of perforations 106 may be made in a predetermined pattern as discussed below. In this manner, the moldability and flowability of the example carbon fiber substrate material to be incorporated into a carbon fiber pre-preg composite material is improved over conventional continuous fiber pre-pregs.

In this example, the perforations are arranged in a staggered discontinuous manner to create the discrete perforations 106. The plurality of continuous carbon fibers 108 are separated by the perforations 106 to form a first plurality of carbon fibers 110 having a first length and a second plurality of carbon fibers 112 having a second length. The perforations 106, as will be described further below, can have any suitable size that correspond to the size of the cutting blades. In one example, the perforations 106 have a width greater than or equal to 0.2 mm to less than or equal to 2 mm, optionally greater than or equal to about 0.1 mm to less than or equal to about 3 mm.

The carbon fibers can have lengths that balance the desired strength of the carbon-fiber reinforced polymeric composite with the desired moldability and flowability. As can be appreciated this balance may differ depending on the desired shape of the end product that is being formed from carbon fiber pre-preg composite materials. In one example, the first plurality of carbon fibers 110 may have a first length of greater than or equal to about 20 mm to less than or equal to about 90 mm and the second plurality of carbon fibers 112 may have a second length of greater than or equal to about 5 mm to less than or equal to about 15 mm. In other examples, the first length is greater than or equal to about 40 mm to less than or equal to about 85 and the second length is greater than or equal to about 5 mm to less than or equal to about 10 mm.

Figure 2:
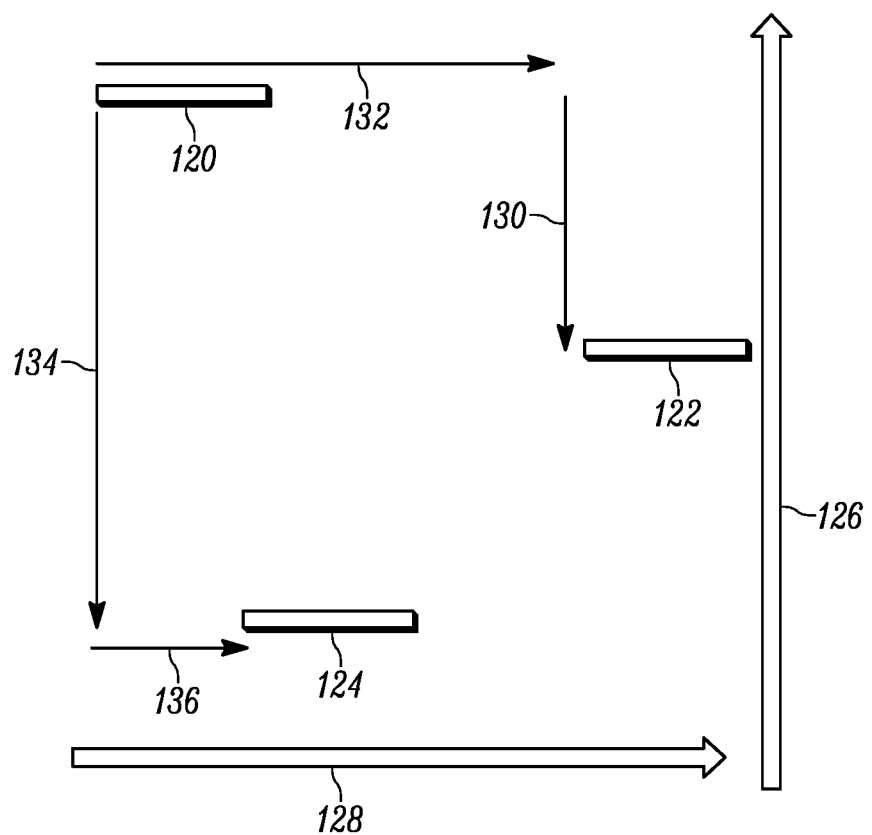
FIG. 2 is a magnified view of a region of perforations within the example perforated carbon fiber substrate material shown in FIG. 1.

Referring now to FIG. 2, an example relationship between the perforations formed in a carbon fiber substrate that can be used to form a carbon fiber pre-preg composite material is illustrated. As shown, a first perforation 120 is separated and staggered from the second perforation 122 and from the third perforation 124. The first perforation 120, the second perforation 122 and the third perforation 124 are staggered and separated from each other both along a length 126 and along a width 128. The second perforation 122 is separated from the first perforation 120 by a first length 130 and by a first width 132. The third perforation 124 is separated from the first perforation 120 by a second length 134 and by a second width 136. The first length 130 is less than the second length 134 and the first width 132 is greater than the second width 136. In this manner, the first perforation 120 can be staggered and separated from adjacent perforations (e.g., the second perforation 122 and the third perforation 124) to create a pattern of varying lengths of the carbon fibers that extend along the carbon fiber substrate that will form the carbon fiber composite material.

The example carbon fiber substrate material previously described can be created using an example cutting assembly 200 shown in FIGS. 3-8. As shown, the cutting assembly 200 includes a support structure 202, a winder 204, a drive assembly 206, a connecting assembly 208 and a perforating assembly 210. The cutting assembly 200 is adapted to cut the perforations 106 into a length of carbon fiber substrate material. As previously stated, carbon fiber substrate material can be prepared as lengths of material that are rolled into a roll of carbon fiber substrate material 212. The cutting assembly 200 can be configured to accept multiple different widths of carbon fiber substrate material and/or different size rolls of carbon fiber substrate material 212. In one example, the cutting assembly is configured to accept rolls of carbon fiber substrate material with widths of 12 inches or 24 inches, by way of non-limiting example. The carbon fiber substrate material is then fed into the cutting assembly 200 where the perforations 106 (like in FIG. 1) are introduced to the material. After processing, the winder 204 then accumulates the perforated carbon fiber substrate material into a perforated roll of carbon fiber substrate material 214.

The support structure 202, in this example, is the structural assembly that supports the other assemblies and components of the cutting assembly 200. The support structure 202, in this example, includes a first side support 216, a second side support 218, a base 220, one or more wheels 222, a top cross member 224, a winder frame 242, a lower cross-member 280, one or more dispensing rollers 228 and a retention roller 230. The first side support 216 and the second side support 218 are positioned on two sides of the cutting assembly 200. The first side support 216 and the second side support 218 project upwards from a floor or other surface where the cutting assembly 200 is positioned. The first side support 216 and the second side support 218 are substantially planar members, in this example, and have various openings and attachment locations at which various other components and subassemblies of the cutting assembly 200 are connected. In this example, the first side support 216 and the second side support 218 are made of a suitable panel of steel that can support the various components and subassemblies of the cutting assembly 200. In other examples, other materials and shapes of the first side support 216 and/or the second side support 218 can be used.

The winder frame 242, the lower cross-member 280, the dispensing rollers 228 and the top cross-member 224 are connected between the first side support 216 and the second side support 218. In this manner, the first side support 216, the second side support 218, the winder frame 242, the lower cross-member 280, the dispensing rollers 228 and the top cross-member 224 create a stable support structure for the cutting assembly 200. A base 220 can be connected to the bottom portion of the first side support 216 and/or the second side support 218. In this example, the bases 220 are L-shaped lengths of metal, such as steel, which are welded to the first side support 216 and to the second side support 218. In other examples, other shapes of the bases 220 can be used. The bases 220 can also be connected to the first side support 216 and/or the second side support 218 using any suitable attachment method including by fasteners, welding, staking or the like.

As further shown in this example, one or more wheels 222 can be secured to the bases 220. In this example, four wheels 222 are secured at the four corners of the bases 220. With this configuration, the cutting assembly 200 can be easily moved. In other examples, the cutting assembly 200 can rest on a floor or other support surface or the bases 220 can be secured at a desired location.

Figure 4:
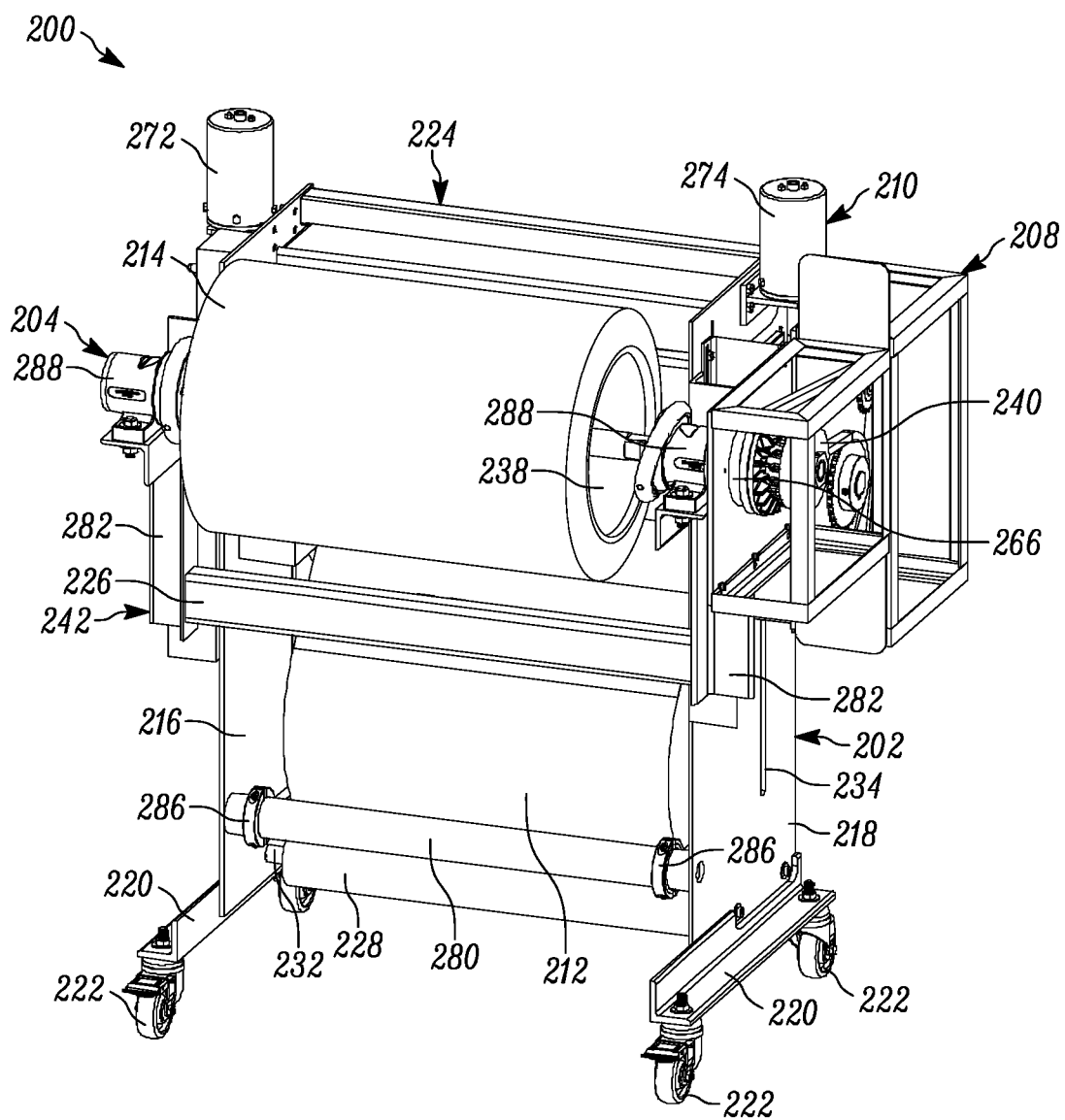
FIG. 4 is a rear perspective view of the example apparatus of FIG. 3.
Figure 5:
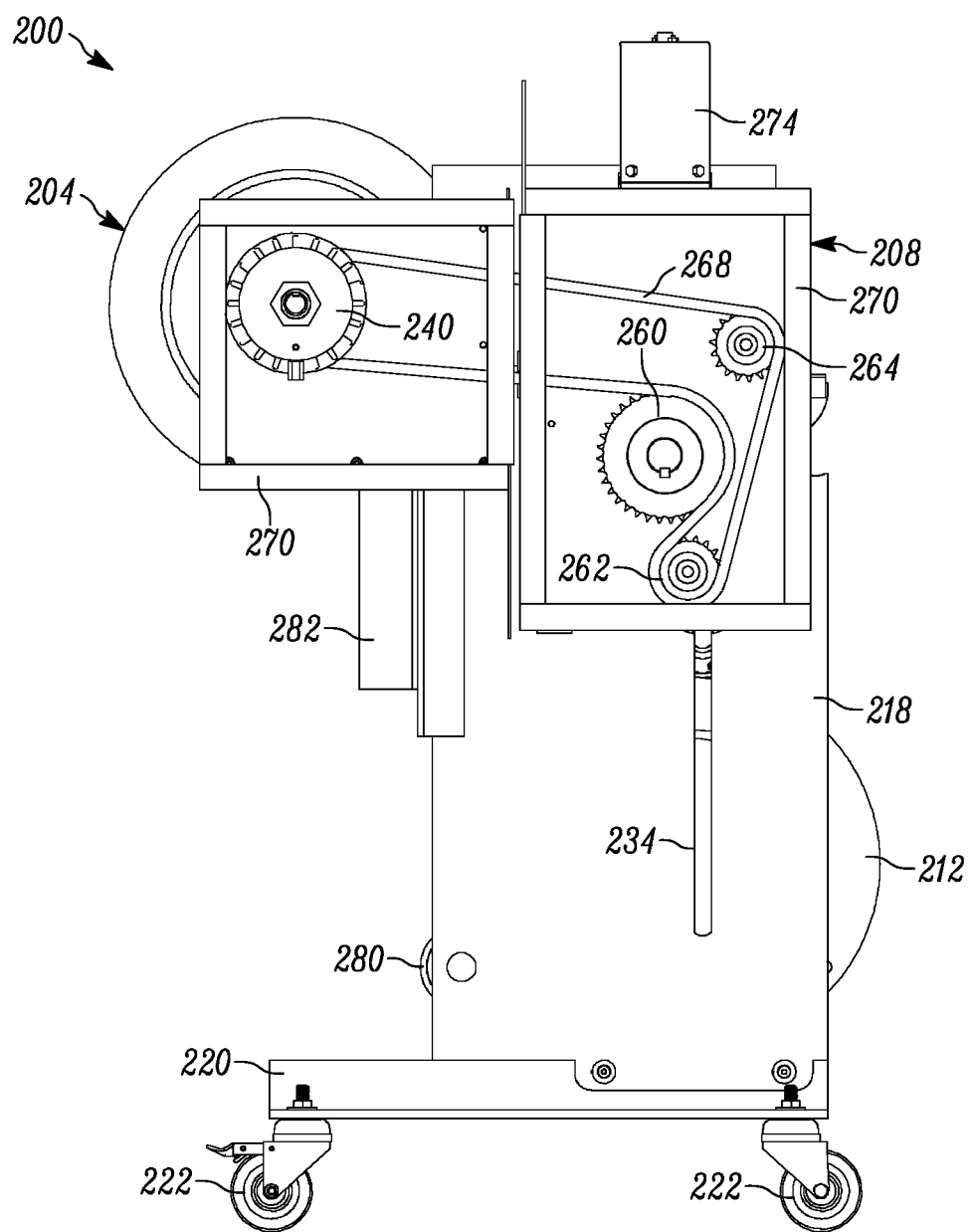
FIG. 5 is a left side view of the example apparatus of FIG. 3.
Figure 6:
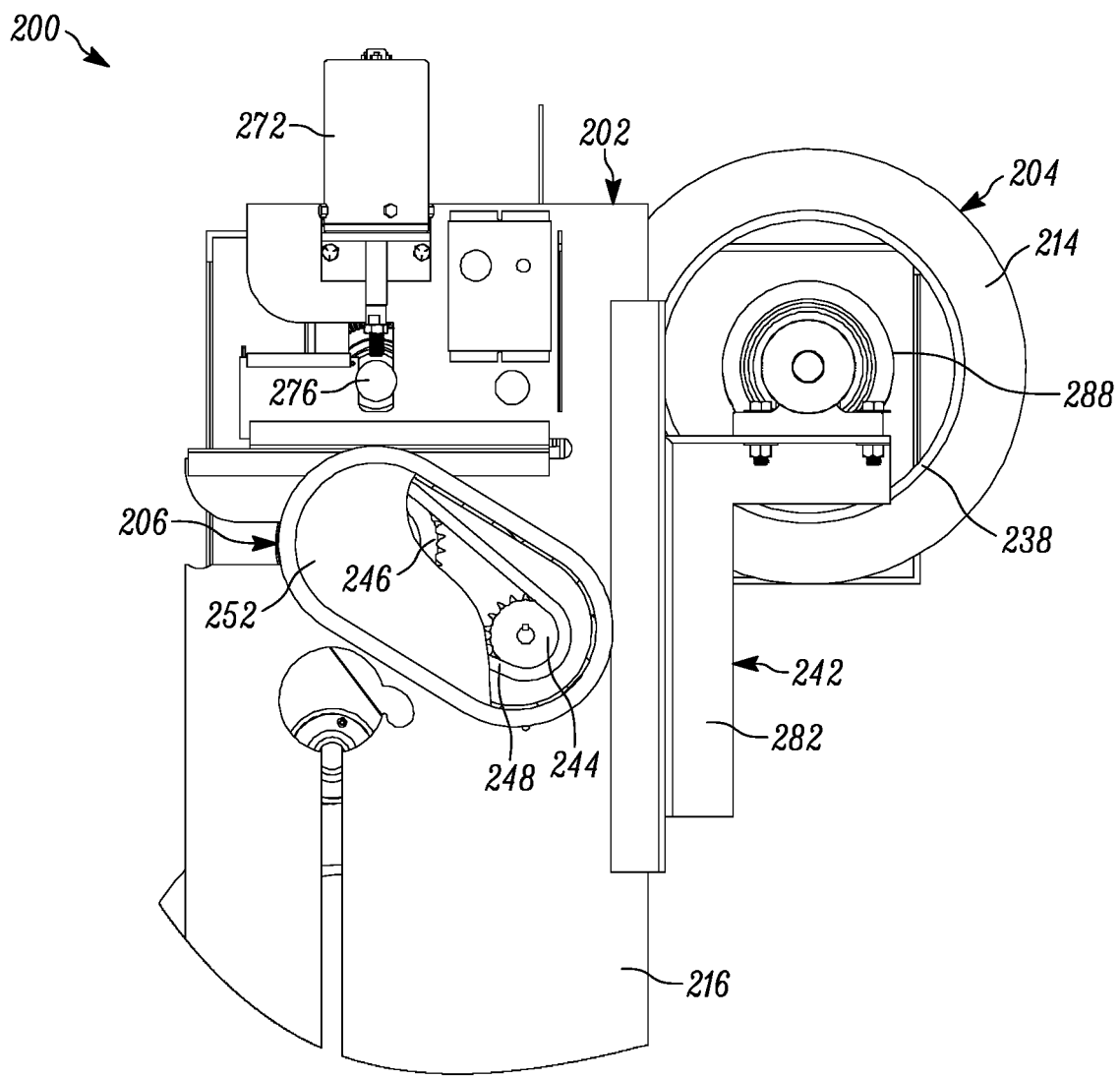
FIG. 6 is a right side view of a portion of the example apparatus of FIG. 6.
Figure 7:
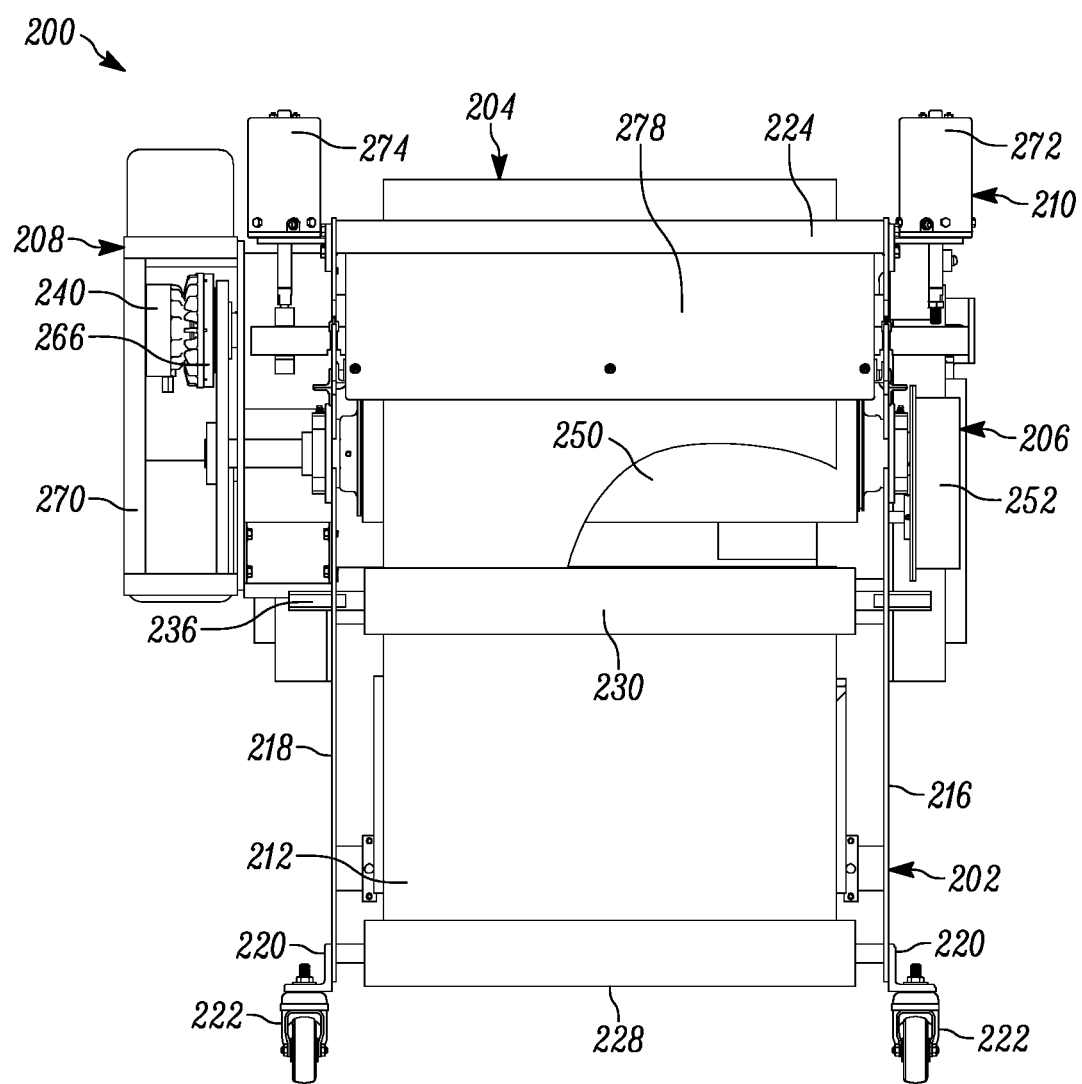
FIG. 7 is a front view of the example apparatus of FIG. 3.

As previously described, the winder frame 242 is connected between the first side support 216 and the second side support 218. The winder frame 242 is positioned between the first side support 216 and the second side support 218 on the back of the cutting assembly 200 as shown in FIG. 4. The winder frame 242 includes a rear cross-member 226 and one or more support brackets 282. The rear cross-member 226 extends across the winder frame 242 between the support brackets 282. The rear-cross-member 226 may be a rectangular tube of steel, in this example, that is connected between the support brackets 282. In other examples, other shapes and configurations of the rear cross-member 226 can be used. The rear cross-member 226 is positioned below the winder 204 and the perforated roll of carbon fiber substrate material 214.

The support brackets 282, in this example, are L-shaped pieces of steel that are welded, fastened or otherwise secured to the first side support 216 and the second side support 218. The support brackets 282 can connect the winder frame 242 to the support structure 202 to support the winder 204 in position at a top and rear portion of the cutting assembly 200.

The dispensing rollers 228 are also connected between the first side support 216 and the second side support 218. The dispensing rollers 228 support the roll of carbon fiber substrate material 212 to permit the carbon fiber substrate material to unwind or be dispensed into the cutting assembly 200 during operation. The dispensing rollers 228, in the example shown, are cylindrical rollers that are connected to axles 232. The axles 232 are secured to the first side support 216 and to the second side support 218. The cylindrical portion of the dispensing rollers 228 are rotatably attached (with bearings or other suitable components) to the axles 232 to permit rotation of the cylinders about the axles 232. In this manner, the roll of carbon fiber substrate material 212 that is supported by the dispensing rollers 228 can rotate to permit the carbon fiber substrate material to unwind from the roll of carbon fiber substrate material 212. In the example shown, the cutting assembly 200 includes two dispensing rollers 228. In other examples, other quantities or configurations of the dispensing rollers 228 can also be used.

The cutting assembly 200 can also include the retention roller 230. The retention roller 230 is received in a slot 234. The retention roller 230 includes a cylindrical portion positioned between the first side support 216 and the second side support 218 that can rotate about a bar 236. The bar 236 is longer than the distance between the first side support 216 and the second side support 218 such that the bar projects away from the first side support 216 and the second side support 218 through the slot 234. In this manner, the dispensing roller 228 is limited from moving in a fore-aft direction but is permitted to slide within the slot 234 in a vertical direction. With this configuration, the retention roller 230 can be placed on top of the roll of carbon fiber substrate material 212. As can be appreciated, the retention roller 230 rests on a top surface of the roll of carbon fiber substrate material 212 and can prevent the roll of carbon fiber substrate material 212 from rolling or otherwise moving off of the dispensing rollers 228 when the cutting assembly 200 is in operation. As shown in this example, one retention roller 230 is used. In other examples, more than one retention roller 230 can be used.

The lower cross-member 280 is also positioned at a lower portion of the support structure 202. The lower cross-member 280 is connected to and extends between the first side support 216 and the second side support 218. The lower cross-member 280, in the example shown, has a circular cross-section. The lower cross-member 280 is positioned rearward of the roll of carbon fiber substrate material 212 and includes two collars 286 and two locating arms 284. The collars 286 clamp to an outer surface of the lower cross-member 280 and can be adjusted and secured in multiple axial positions along the lower-cross member 280. The locating arms 284 are connected to and extend away from the collars 286. The locating arms 284 extend away from the collars 286 and toward a front of the cutting assembly 200. In this manner, the locating arms 284 can be positioned on opposite sides of the roll of carbon fiber substrate material 212 to assist in centering the roll of carbon fiber substrate material 212 on the dispensing rollers 228. The adjustable locating arms 284 can be particularly useful in maintaining a desired position of the roll of carbon fiber substrate material 212 on the dispensing rollers 228 when the width of the roll of carbon fiber substrate material 212 is less than the overall width of the cutting assembly 200.

The top cross-member 224, in this example, is positioned at or near the top of the support structure 202 and is positioned between the first side support 216 and the second side support 218. The top cross-member 224 is a rectangular tube that is welded between the first side support 216 and the second side support 218. In other examples, other shapes and configurations of the top cross-member 224 can be used. In addition, the top cross-member 224 can be secured between the first side support 216 and the second side support 218 using fasteners or other suitable connecting methods.

As shown in this example, the cutting assembly 200 also includes the winder 204 positioned at the top and rear portion of the cutting assembly 200. The winder 204 includes a spool 238, two safety chucks 288 and a clutch mechanism 240. The winder 204 accumulates the perforated roll of carbon fiber substrate material 214 after the carbon fiber substrate material passes through the cutting assembly 200 and is perforated by the perforating assembly 210. The spool 238 is a cylindrical member that can rotate about the clutch mechanism 240 and wind the perforated carbon fiber substrate material into the perforated roll of carbon fiber substrate material 214.

The winder 204 is connected to the support structure 202 by the winder frame 242 and the two safety chucks 288. The two safety chucks 288 are mounted to the winder frame 242 on opposite ends of the spool 238. The safety chucks 288 permit the spool 238 to rotate and to be removably connected the winder frame 242. As will be explained, the winder 204 is mechanically coupled to the drive assembly 206 by the connecting assembly 208. As such, the winder 204 rotates as the carbon fiber substrate material travels through the cutting assembly 200 to accumulate the perforated carbon fiber substrate material on the spool 238. As the perforated carbon fiber substrate material accumulates on the spool 238, the diameter of the roll of perforated carbon fiber substrate material increases. If the winder is turning at a constant rotational speed, the linear velocity of the perforated carbon fiber substrate material increases as the diameter of the roll of perforated carbon fiber substrate material 214 increases. This condition can cause the winder 204 to pull on the carbon fiber substrate material in the cutting assembly 200. It is undesirable to pull the carbon fiber substrate material in the cutting assembly 200 because the carbon fiber substrate material can tear or otherwise break in the cutting assembly 200 and cause malfunction and/or down-time.

In order to prevent the winder 204 from pulling on the carbon fiber substrate material in the cutting assembly 200, the winder 204 includes the clutch mechanism 240. The clutch mechanism 240 is positioned at one end of the spool 238 positioned near the second side support 218. The clutch mechanism 240, in the example shown, is a slip clutch that is coupled between the spool 238 and the fourth sprocket 266 of the connecting assembly 208. The clutch mechanism 240 is adjustable and can be adjusted to maintain a predetermined torque level on the spool 238 to maintain tension on the carbon fiber substrate material that is being accumulated on the spool 238 after it is perforated by the cutting assembly 200. When the predetermined torque on the spool 238 is reached, the clutch mechanism 240 causes the spool 238 to rotationally slip from its mechanical coupling to the fourth sprocket 266 of the connecting assembly 208 and then re-engage when the torque on the spool 238 drops below the predetermined torque level. In this manner, tension is maintained on the carbon fiber substrate material.

In the example shown, the clutch mechanism 240 is a pneumatic slip clutch with a 1 inch inner diameter. The clutch mechanism 240 is fluidly connected to a source of compressed air and/or a related valve and control system. Such a pneumatic system can be used to adjust the predetermined torque level by changing the pressure of the compressed air supplied to the clutch mechanism 240. In other examples, the clutch mechanism 240 can be positioned at an opposite end of the spool 238 and/or can be electronically or otherwise controlled to adjust the tension exerted on the carbon fiber substrate material.

Figure 3:
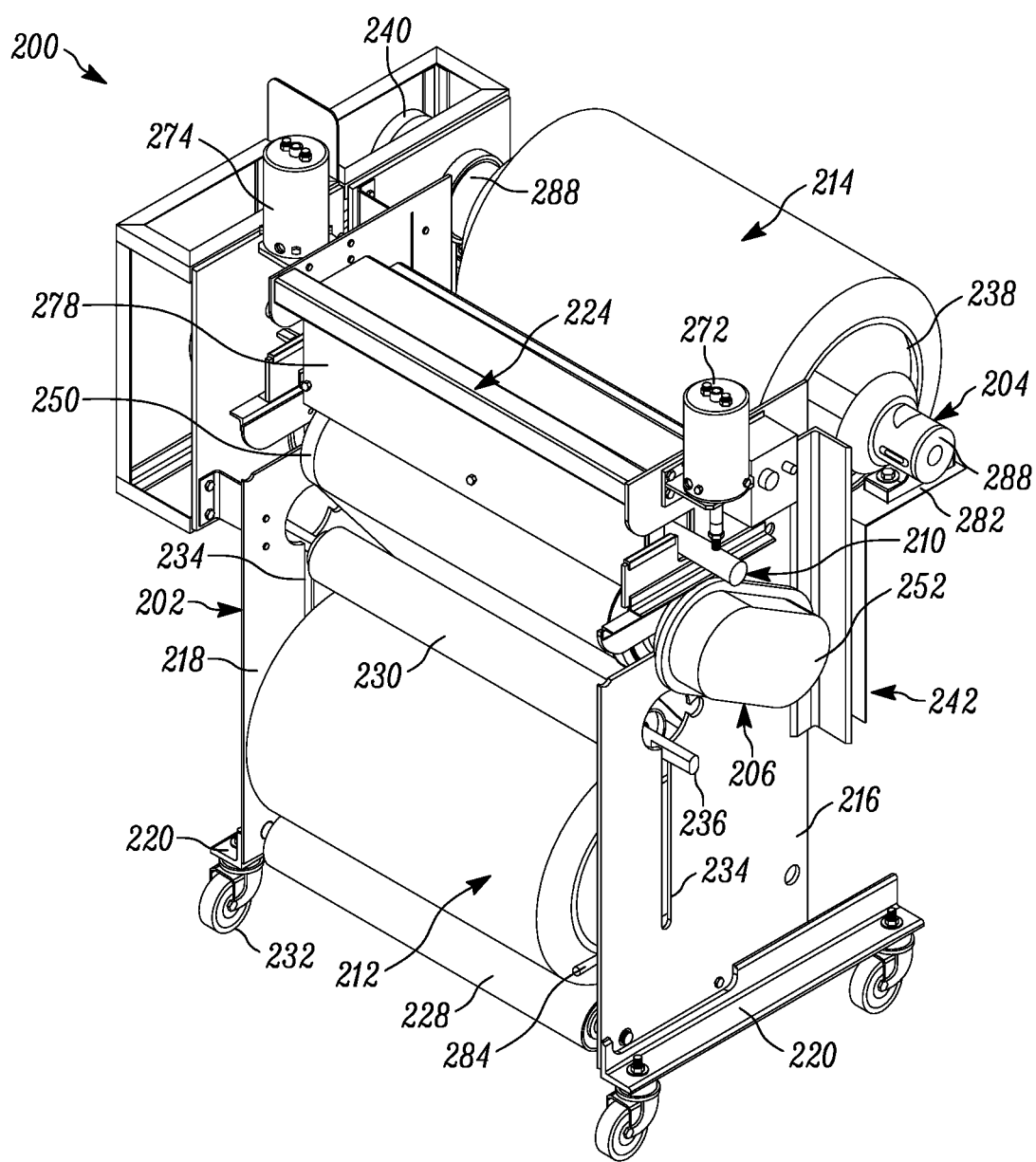
FIG. 3 is a front perspective view of an example apparatus for manufacturing the perforated carbon fiber substrate material of FIG. 1.

As shown in FIG. 3, the cutting assembly 200 includes the drive assembly 206 mounted on the first side support 216. The drive assembly 206 includes a motor (not shown), a first gear 244, a second gear 246, a chain 248 and an anvil 250. The drive assembly 206 causes rotation of the anvil 250 that, in turn, causes the carbon fiber substrate material to be drawn from the roll of carbon fiber substrate material 212 through the perforating assembly 210 and be accumulated by the winder 204. The motor can be any suitable motor that can be mounted to the support structure 202 with a sufficient torque capacity to drive the anvil 250. In one example, a 90 volt, DC electric gear motor is used.

The motor is mechanically coupled to the first gear 244. The first gear 244 is coupled to the second gear 246 by the chain 248. The first gear 244 and the second gear 246 are appropriately sized to induce the desired linear displacement of the carbon fiber substrate material through the cutting assembly 200. In the example, shown the desired linear displacement of the carbon fiber substrate material through the cutting assembly 200 is a maximum of 6 feet per minute. In this example, the first gear 244 is an ASA 40 sprocket with 18 teeth and the second gear 246 is an ASA 40 sprocket with 30 teeth. The chain 248 is sized to accommodate the sizing of the first gear 244 and the second gear 146. In this example, the chain 248 is an ASA 40 chain with a length of approximately 26 inches. In other examples, other sizes of the first gear 244, the second gear 246 and the chain 248 can be used. A chain guard 252 can be included in the drive assembly 206. The chain guard 252 is piece of formed steel (or other suitable material) that can be placed over the first gear 244, the second gear 246 and the chain 248 for safety reasons and/or to prevent interference with the drive assembly 206.

Figure 8:
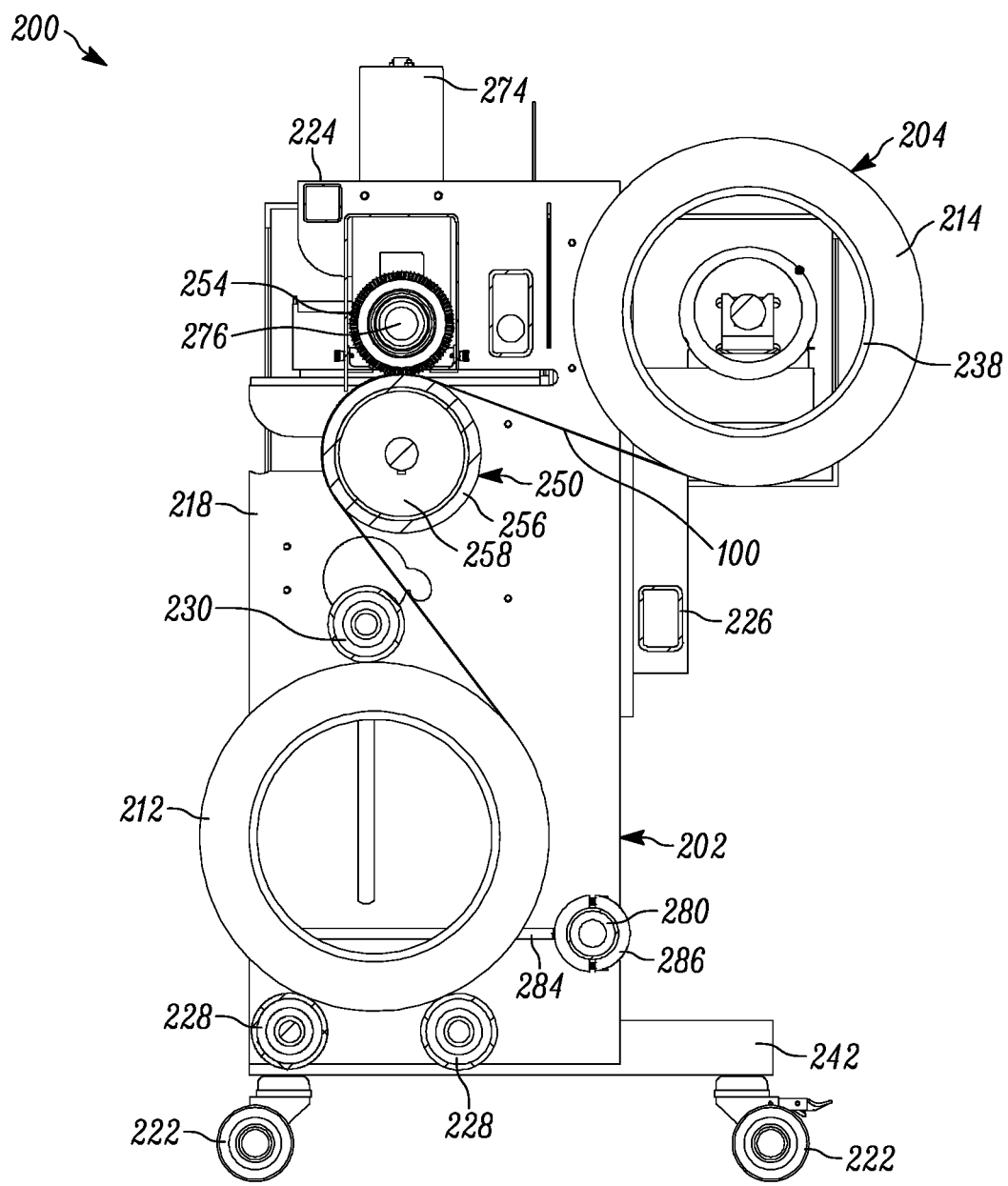
FIG. 8 is a right side view of the example apparatus of FIG. 3 shown without the side support panel.

The second gear 246, in the example shown, is connected to one end of the anvil 250 that projects through the first side support 216. With this configuration, the rotational motion of the motor causes the second gear 246 to rotate with the rotational motion of the first gear 244. The anvil 250 is a cylindrical member that rotates to cause the carbon fiber substrate material to move through the cutting assembly 200. As shown in FIG. 8, the carbon fiber substrate material from the roll of carbon fiber substrate material 212 is routed upwards around an outer surface of the anvil 250 before being accumulated on the winder 204. The carbon fiber substrate material moves between a cutting wheel 254 of the perforating assembly 210 before it is accumulated on the winder 204 where the carbon fiber substrate material is perforated with the perforations 106.

In order to induce the movement of carbon fiber substrate material through the cutting assembly 200, the anvil 250 has an outer layer 256 over a core 258. In the example shown, the outer layer 256 is made of an elastomeric material, such as neoprene rubber or a siloxane material and the core 258 is made of a tube formed from a metal, such as a steel alloy. The carbon fiber substrate material is moved through the cutting assembly 200 by friction between the carbon fiber substrate material and the outer layer 256 of the anvil 250 as the carbon fiber substrate material is compressed against the anvil 250 by the cutting wheel 256. In other examples, other materials can be used for the outer layer 256 and/or the core 258.

The rotational motion of the motor previously described is translated to the winder 204 by the connecting assembly 208. The connecting assembly 208 is positioned on the second side support 218 of the cutting assembly 200. In this example, the connecting assembly 208 includes a first sprocket 260, a second sprocket 262, a third sprocket 264, a fourth sprocket 266 and a chain 268. The first sprocket 260 is connected at a second end of the anvil 250 that projects outward from the second side support 218. The second sprocket 262 and the third sprocket 264 are mounted to the second side support 218 and are free to freely rotate. The fourth sprocket 266 is mounted to the clutch mechanism 240. The chain 268 is routed in the manner shown on FIG. 5 around the first sprocket 260, the second sprocket 262, the third sprocket 264 and the fourth sprocket 266. With the routing as shown, the rotational motion of the first sprocket 260 causes rotation in the reverse direction at the fourth sprocket 260. In this manner, the winder 204 is induced to rotate in a reverse (or opposite) direction relative to the anvil 250. The clutch mechanism 240 (previously described) is connected to the fourth sprocket 266. In this manner, the connecting assembly 208 causes the spool 238 to rotate with a rotational speed that is proportional to the rotational speed of the anvil 250. As previously discussed, the clutch mechanism 240 permits the spool 238 to rotationally slip from the rotation of the fourth sprocket 266 to maintain a predetermined torque level on the spool 238 to maintain tension on the carbon fiber substrate material.

In the example shown, the first sprocket 260, the second sprocket 262, the third sprocket 264, the fourth sprocket 266 and the chain 268 are sized similarly to the first gear 244 and the second gear 246 in that they are ASA 40. In other examples, the first sprocket 260, the second sprocket 262, the third sprocket 264, the fourth sprocket 266 and the chain 268 can be sized differently or can be configured as wheels with a connecting belt.

The connecting assembly 208 can also include one or more housings 270 that can surround or enclose the first sprocket 260, the second sprocket 262, the third sprocket 264, the fourth sprocket 266 and/or the chain 268. The housing(s) 270 can mounted to the second side support 218. The housing(s) 270 can include cover panels (not shown) that prevent operators or foreign objects from interfering with or being entangled in the first sprocket 260, the second sprocket 262, the third sprocket 264, the fourth sprocket 266 and/or the chain 268.

The cutting assembly 200, in the example shown, also includes the perforating assembly 210. The perforating assembly 210 is a subassembly of the cutting assembly 200 that creates the perforations 106 in the carbon fiber substrate material. The perforating assembly 210 includes the cutting wheel 254, a first cylinder 272 and a second cylinder 274. As will be further described below, the cutting wheel 254 is cylindrical with a series of blades projecting radially outward from the outer surface of the cutting wheel 254 that cut the perforations 106 in the carbon fiber substrate material as the carbon fiber substrate material moves through the cutting assembly 200. As shown in FIG. 8, the carbon fiber substrate material 100 is compressed between the cutting wheel 254 and the anvil 150. As this occurs the blades in the cutting wheel 254 pierce the carbon fiber substrate material 100 and shear the perforations 106 to create the pattern of perforations 106 shown, for example, in FIG. 1. In the example shown, the cutting wheel 254 is not directly driven the drive assembly 206 or the connecting assembly 208. Instead, the cutting wheel 254 rotates as the carbon fiber substrate material 100 is moved by the anvil 250 between the anvil 250 and the cutting wheel 254 as previously described.

In the example cutting assembly 200, the first cylinder 272 and the second cylinder 274 apply a downward force on the axis 276 of the cutting wheel 254. The force applied by the first cylinder 272 and the second cylinder 274 is sufficient that the blades of the cutting wheel pierce the carbon fiber substrate material to create the perforations 106 as the blades break through the fibers of carbon fiber substrate material and displace the elastomeric outer layer 256 of the anvil 250. The first cylinder 272 and the second cylinder 274 are pneumatically actuated air cylinders in this example. The first cylinder 272 and the second cylinder 274 are connected to opposite ends of the axis 276 and to the support structure 202. In this configuration, the first cylinder 272 and the second cylinder 274 can apply a variable downward force to the cutting wheel 254. The first cylinder 272 and the second cylinder 274 can be fluidly connected to source of compressed air with a regulator, valve and/or other control mechanism such that the air pressure supplied to the first cylinder 272 and the second cylinder 274 can be variably adjusted. In the example shown, the source of compressed air is applied such that the first cylinder 272 and the second cylinder 274 apply a downward force that compresses the cutting wheel 254 against anvil 150 with a pressure in the range of 20 psi to 30 psi. In other examples, the cutting wheel 254 can be compressed against the anvil 250 at other pressures, for example, at a pressure in the range of 5 psi to 40 psi.

In addition to applying a downward force to the cutting wheel 254, the first cylinder 272 and the second cylinder 274 can move the cutting wheel 254 upwards away from the anvil 250. The first cylinder 272 and the second cylinder 276 can move the cutting wheel 254 away from the anvil 250 so that the carbon fiber substrate material can be loaded into the cutting assembly 200 and/or the cutting wheel 254 can be removed, replaced, repaired or maintained as desired. To assist in this regard, the first cylinder 272 and/or the second cylinder 276 can have one or more cradles that are connected to the movable rods of the cylinders. The cradles can have a C- or U-shape that can receive the axis 276 of the cutting wheel 254. A clevis pin or other locking feature can close the cradle around the axis 276 to secure the cutting wheel 254 to the first cylinder 272 and/or the second cylinder 276. In other examples, other connecting features can be used to secure the cutting wheel 254 to the first cylinder 272 and/or the second cylinder 274.

The cutting assembly 200 can also include one or more shield panels 278. The shield panels are planar pieces of steel, plastic or other material that are placed near to or around the cutting wheel 254 to shield operators from the cutting wheel 254 and to prevent items from interfering with or damaging the cutting wheel 254. As shown, a shield panel can be secured to the support structure 202 in front of the cutting wheel 254 and another shield panel 278 can be secured to the support structure 202 behind the cutting wheel 254. In other examples, more or less shield panels 278 can also be used.

Figure 9:
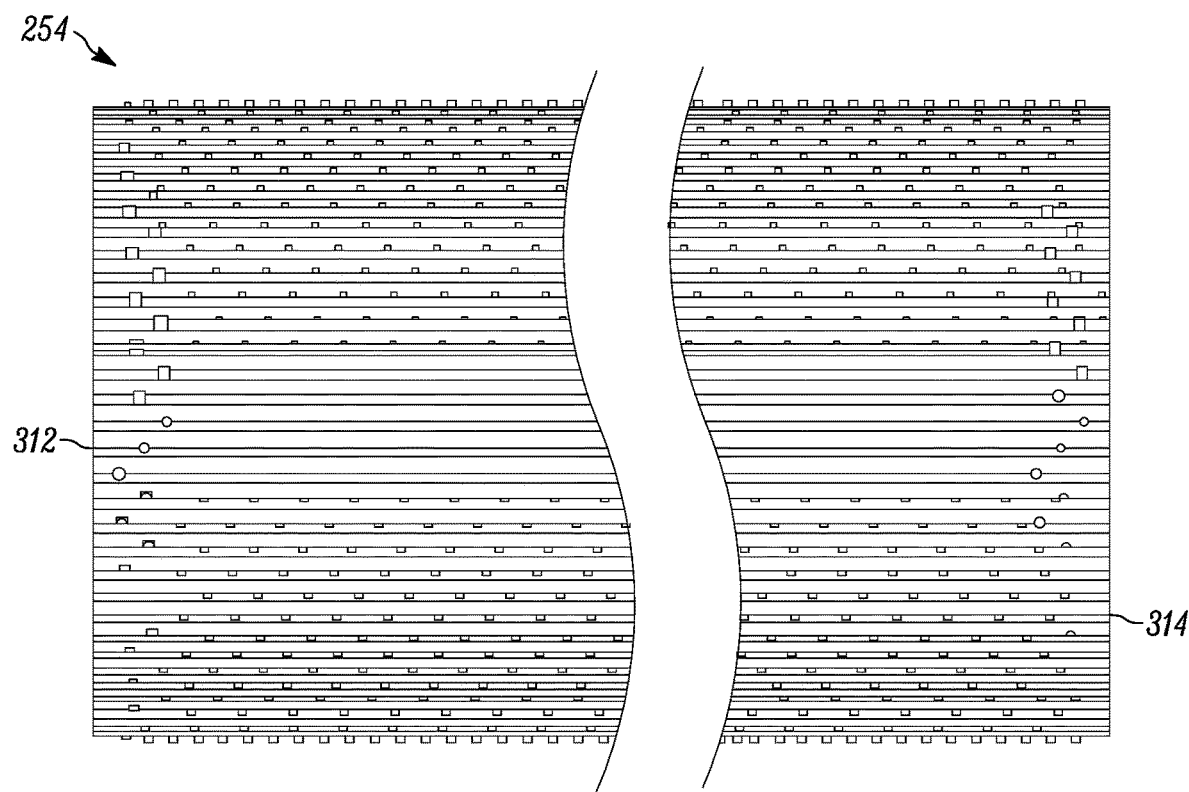
FIG. 9 is a front view of an example cutting wheel that can be used in the apparatus of FIG. 3.
Figure 10A:
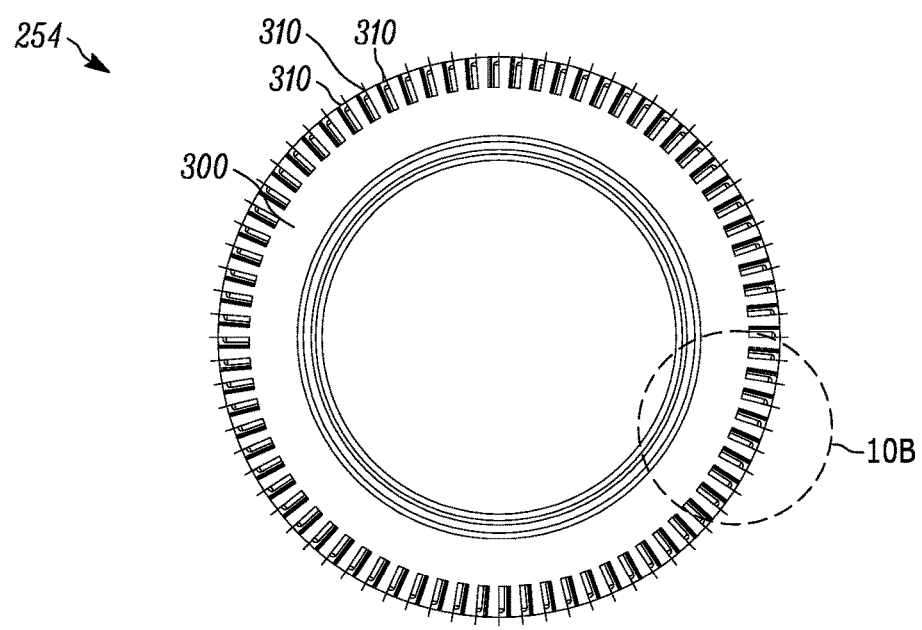
FIG. 10A is a side view the example cutting wheel of FIG. 9.
Figure 10B:
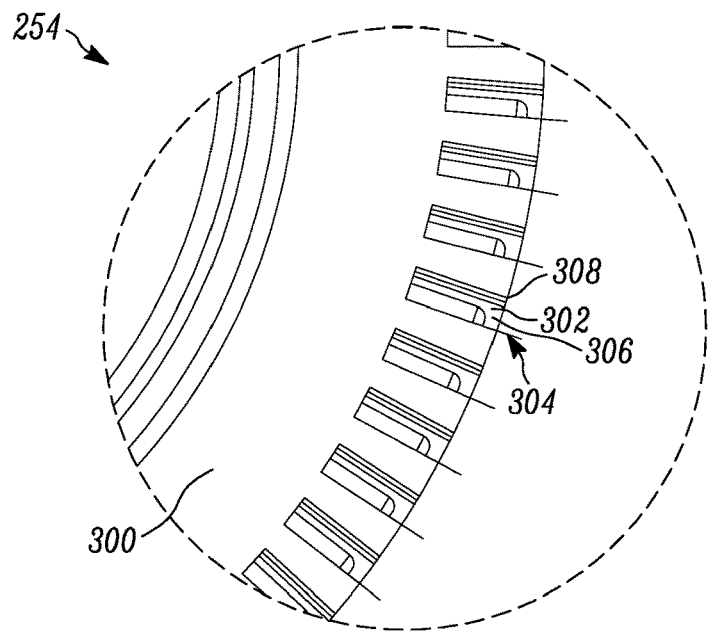
FIG. 10B is a magnified view of a portion of the cutting wheel as indicated on FIG. 10A.
Figure 11:
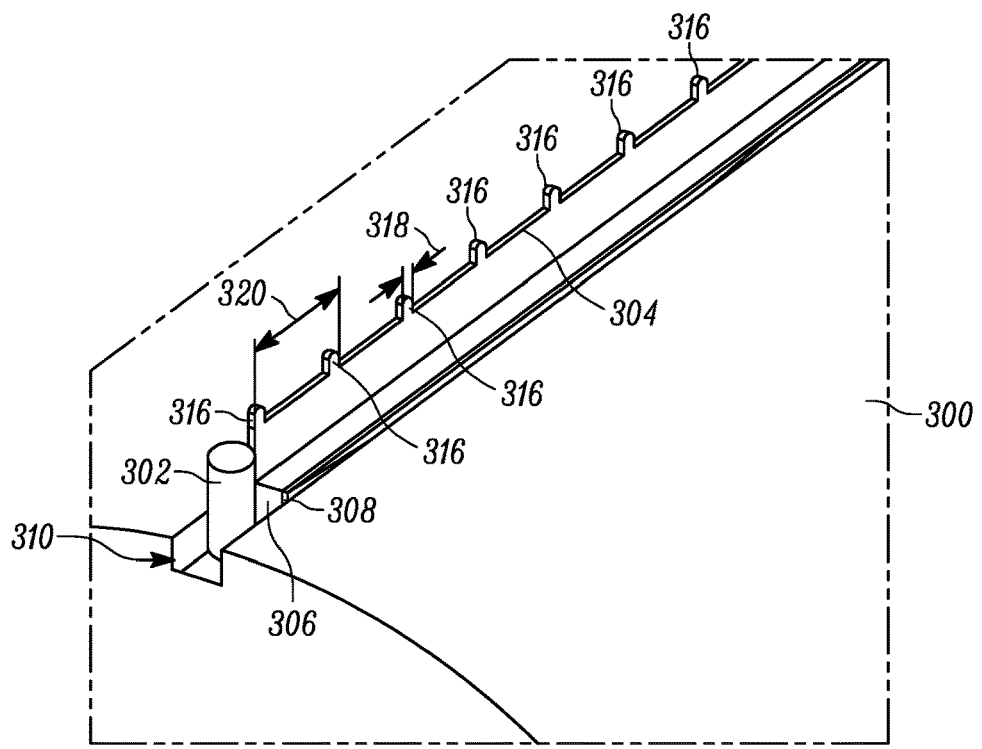
FIG. 11 is a magnified view of a portion of the example cutting wheel of FIG. 9 showing one channel.

As discussed above, the cutting wheel 254 is the member received on the axis 276 that creates the perforations 106 in the carbon fiber substrate material. One example cutting wheel 254 is shown in FIGS. 9-11. In this example, the cutting wheel 254 includes a body 300, a plurality of locator pins 302, a plurality of blades 304, a plurality of spacers 306 and a plurality of springs 308. The body 300 is cylindrical and includes a plurality of channels 310 that extend axially along the outer surface of the body 300. The channels 310 have a rectangular cross-section and project inward toward a center of the cylindrical body 300. The channels 310 extend axially between a first side 312 and a second side 314 of the body 300 and are evenly spaced around the circumference of the body 300.

The plurality of blades 304 are received into the channels 310. The blades 304 have a height that is greater than the depth of the groove 310 such that the blade projects above the outer surface of the body 300. The blades 304 also include one or more rectangular projections 316 that project outward as shown in FIG. 11. The projections 316 have a projection width 318 and are spaced apart from adjacent projections 316 by a gap 320 such that the carbon fiber substrate material will be cut with the perforations 106 in a desired staggered pattern as shown in FIG. 1 or as will be further described below.

The blades 304 are made of thin pieces of steel. In the example shown, the blades 304 are made or a 0.01 inch thickness blade stock. In other examples, other sizes of the blade materials can be used. The blades 304 have a thickness that is less than the width of the channels 310. To hold the blades 304 in the channels 310, the spacers 306 are inserted into the channels 310 adjacent to the blades 304. The springs 308 are then inserted into the remaining opening between the spacers 306 and the walls of the channels 310. The spacers 306 are rectangular lengths of material that have a length similar or the same as the length of the blades 304. The springs 308 are elongated curved lengths of spring steel, in this example. As can be appreciated, the springs 308 have a curvature that requires the springs 308 to be flattened in order to be inserted into the opening between the spacers 306 and the walls of the channels 310. In this manner, the springs 308 exert a force against the spacers 306 that keeps the blades 304 (and spacers 306) in position in the channels 310 during the operation of the cutting assembly 200.

Figure 12:
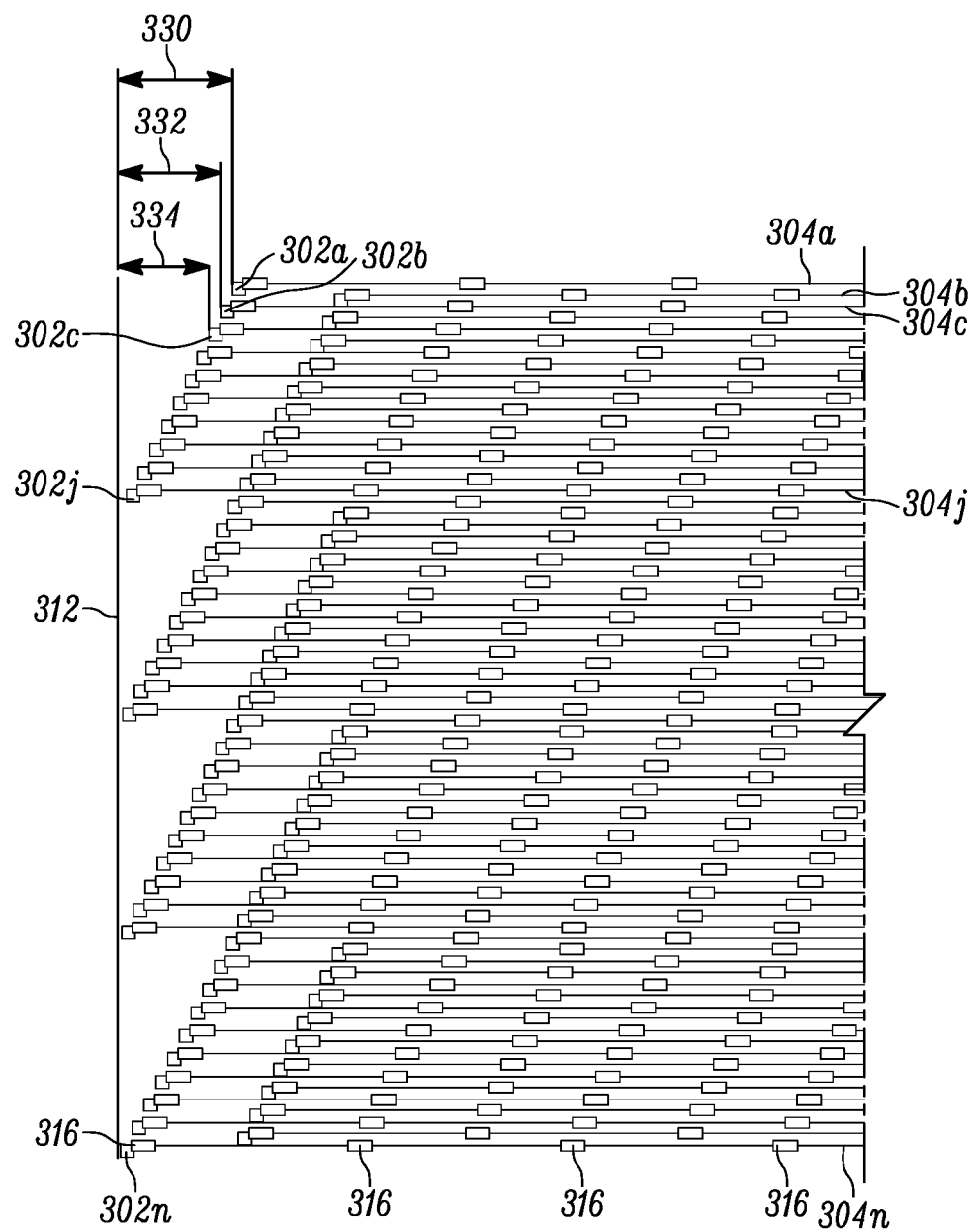
FIG. 12 is an illustration of an example layout of the blades used in the cutting wheel of FIG. 9.

In the example cutting wheel 254 shown in FIGS. 9 and 10, the body 300 includes 76 evenly distributed channels spaced apart from one another around the circumference. The cutting wheel 254 also includes 76 blades that include the same number of projections 316 that have the same projection width 318 and the same gaps 320. In order to create a staggered pattern for the projections 106 in the carbon fiber substrate material, the blades 304 are staggered inside the channels 310. As shown in FIGS. 9 and 12, the cutting wheel 254 includes the plurality of locator pins 302 that are positioned in the channels 310 at various positions relative to the first side 312 of the body 300. A corresponding locator pin 302 is also inserted in the channel 310 at a corresponding location relative to the second side 314 to maintain the axial position of the blade 304 in the channel 310.

With the configuration previously described, the cutting wheel 254 can be easily assembled, repaired and maintained with multiple blades 304 that all include the same length, the same number of projections 316, the same projection width 318 and the same gaps 320. In the example shown, the cutting wheel 254 includes 76 blades 304 that all have the same size and shape.

As illustrated in FIG. 12, the locator pins 302 are positioned on the body 300 at desired distances from the first side 312. For example, the cutting wheel 254 can include the plurality of locator pins 302a to 302n that are positioned around the circumference of the body 300. In one example, the first locator pin 302a is positioned at a first distance 330 from the first side 312. The second locator pin 302b is positioned at a second distance 332 from the first side 312. The third locator pin 302c is positioned at a third distance 334 from the first side 312. The differences between the first distance 330 and the second distance 332 is the same as the difference between the second distance 332 and the third distance 334. In this pattern, the locator pins 302a, 302b, 302c are evenly positioned at decreasing distances from the first side 312. This pattern is repeated for subsequent locator pins 302 until the locator pin 302 is located at or near the first side 312. In the example illustrated in FIG. 12, the locator pins 302 are positioned closer to the first side 312 as previously described from locator pins 302a through 302j. After locator pin 302j, the pattern of the locator pins 302 repeats as described above.

With the locator pins 302 positioned as previously described, the blades 304 can then be inserted into the channels 310 of the body 300 to abut the locator pins 302 at the axial ends of the blades 304. Since the blades 304a through 304n have the same shape with the same arrangement of projections 316, the projections 316 have a staggered pattern with respect to adjacent projections 316 on adjacent blades 304.

In the example cutting wheel 254 shown in FIGS. 9-11, the body 300 of the cutting wheel 254 has 76 channels evenly spaced around its circumference. The blades 304 have projections 316 with projection widths of 1 mm and gaps 320 of 9.5 mm. In other examples, the cutting wheel 254 can have other arrangements and configuration of the locator pins 302 and/or the blades 304 to result in other desired patterns of the perforations 106 in the carbon fiber substrate material.

The body 300 of the cutting wheel 254 can include one or more holes in the channels 310 to receive the locator pins 302. The locator pins 302 can be press fit or threaded into such holes in the channels 310 to retain the locator pins in position in the channels 310. A series of holes can be included in the channels 310 at predetermined distances from the first 312 of the body 300. As such, the body 300 of the cutting wheel 254 can be re-configurable to adjust the spacing of the blades 304 in the cutting wheel 254.

The cutting assembly 200 can be used to produce a carbon fiber substrate material with a desired pattern of perforations 106 such as the pattern shown in FIG. 1. When a desired pattern of perforations 106 is determined, the locator pins 302 are positioned in the channels 310 of the cutting wheel 254 in a corresponding fashion to result in the desired pattern. The cutting wheel 254 is mounted to the cutting assembly 200 in the perforating assembly 210. A roll of carbon fiber substrate material 212 is inserted into the cutting assembly by placing the roll of carbon fiber substrate material 212 onto the dispensing rollers 228. The retention roller 230 can be placed on top of the roll of carbon fiber substrate material 212 by inserting the bar 236 into the slot 234 of the support structure 202. The carbon fiber substrate material is then routed around the anvil 250 and to the winder 204.

The cutting wheel 254 can then be lowered in position to contact the carbon fiber substrate material and compress the carbon fiber substrate material between the cutting wheel 254 and the anvil 250. The motor of the cutting assembly 200 can then be engaged to begin the rotation of the anvil via the drive assembly 206. The outer layer 256 of the anvil 250 draws the carbon fiber substrate material through the perforating assembly 210 that causes the projections 316 to shear the carbon fiber substrate material in the desired pattern. The winder 204 also rotates as a result of the connecting assembly 208 and accumulates the perforated carbon fiber substrate material on the spool 238.

During operation of the cutting assembly 200, operators can adjust the drive assembly 206, the perforating assembly 210 and/or the winder 204 as desired. An operator can adjust the drive assembly 206 by changing the speed of the motor to cause the rotational speed of the anvil 250 to increase or decrease as desired. The operator can also adjust the perforating assembly 210 by adjusting the downward force applied by the first cylinder 272 and/or the second cylinder 274 on the cutting wheel 254. The operator can also adjust the clutch mechanism 240 of the winder 204 to change the pull force that may be applied to the perforated carbon fiber substrate material as it is accumulated on the spool 238.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for perforating a carbon fiber substrate material comprising:
   a support structure including a first side support and a second side support;
   a cylindrical anvil rotatably connected between the first side support and the second side support, the anvil configured to move the carbon fiber substrate material in response to rotation of the anvil; and
   a cylindrical cutting wheel rotatably connected to the support structure between the first side support and the second side support and positioned adjacent to the anvil, the cutting wheel including,
      an outer circumferential surface that defines a plurality of axial channels spaced apart from one another around the cutting wheel,
      a plurality of blades projecting outward from an outer surface of the cutting wheel, wherein the blades of the cutting wheel are configured to perforate the carbon fiber substrate material when the carbon fiber substrate material moves between the anvil and the cutting wheel, wherein each blade of the plurality of blades is positioned inside a channel of the plurality of channels, and
      a plurality of springs wherein each spring of the plurality of springs is positioned adjacent to each blade of the plurality of blades inside the plurality of channels to retain the plurality of blades inside the plurality of channels.

2. The apparatus of claim 1 wherein the anvil includes an outer layer and a core, the outer layer comprising an elastomeric material and the core comprising a metal, the outer layer wrapped around the core and configured to grip the carbon fiber substrate material to move the carbon fiber substrate material through the apparatus.

3. The apparatus of claim 2 further comprising a motor coupled to the anvil that is configured to rotate the anvil.

4. The apparatus of claim 1 wherein a quantity of blades in the plurality of blades is the same as a quantity of springs in the plurality of springs.

5. The apparatus of claim 1 wherein each blade of the plurality of blades includes one or more projections that project radially outward from the plurality of channels, the one or more projections configured to perforate the carbon fiber substrate material.

6. The apparatus of claim 1 further comprising:
   at least one air cylinder connected to the support structure and to the cutting wheel, the at least one air cylinder configured to move the cutting wheel toward and away from the anvil.

7. The apparatus of claim 6 wherein the at least one air cylinder is adjustably connected to a source of compressed air such that the cutting wheel can be adjusted to contact the carbon fiber substrate material against the anvil whereby the plurality of blades perforate the carbon fiber substrate material.

8. The apparatus of claim 1 further comprising:
   a first air cylinder connected to a first end of the cutting wheel and a second air cylinder connected to a second end of the cutting wheel, the first air cylinder and the second air cylinder configured to adjustably move the cutting wheel relative to the anvil such that the carbon fiber substrate material is compressed between the plurality of blades of the cutting wheel and the anvil to perforate the carbon fiber substrate material.

9. An apparatus for perforating a carbon fiber substrate material comprising:
   a support structure including a first side support and a second side support;
   a cylindrical anvil rotatably connected between the first side support and the second side support, the anvil configured to move the carbon fiber substrate material in response to rotation of the anvil; and
   a cylindrical cutting wheel rotatably connected to the support structure between the first side support and the second side support and positioned adjacent to the anvil, the cutting wheel including a plurality of blades projecting outward from an outer surface of the cutting wheel, wherein the blades of the cutting wheel are configured to perforate the carbon fiber substrate material when the carbon fiber substrate material moves between the anvil and the cutting wheel; and
   a winder connected to the support structure between the first side support and the second side support, the winder including a cylindrical spool configured to collect the carbon fiber substrate material after the carbon fiber substrate material is perforated.

10. The apparatus of claim 9 wherein the spool is mechanically coupled to the anvil to cause the spool to rotate during operation to collect the carbon fiber substrate material after the carbon fiber substrate material is perforated.

11. The apparatus of claim 10 wherein the winder includes a clutch mechanism coupled to the spool, the clutch mechanism adjustably coupling the anvil to the spool to drive the spool at a maximum rotational speed that is proportional to a rotational speed of the anvil such that an adjustable torque is exerted on the spool to maintain tension on the carbon fiber substrate material.

12. The apparatus of claim 11 further comprising:
   a connecting assembly mechanically coupling the anvil to the winder, the connecting assembly including a first sprocket, a second sprocket, a third sprocket, a fourth sprocket and a chain, the first sprocket connected to the anvil, the second and third sprocket connected to the second side support and the fourth sprocket connected to the clutch mechanism, the chain mechanically coupling the first sprocket, the second sprocket, the third sprocket and the fourth sprocket and causing the fourth sprocket to rotate in an opposite rotational direction from a rotational direction of the first sprocket.

13. An apparatus for perforating a carbon fiber substrate material comprising:
- a support structure including a first side support and a second side support;
- at least one dispensing roller rotatably connected to the support structure between the first side support and the second side support, the at least one dispensing roller configured to support a roll of the carbon fiber substrate material thereon and to permit the roll of the carbon fiber substrate material to rotate as the carbon fiber substrate material is dispensed from the roll;
- a winder supported between a first side support and a second side support, the winder including a cylindrical spool configured to collect the carbon fiber substrate material from the roll;
- a cylindrical cutting wheel rotatably connected to the support structure between the first side support and the second side support between the at least one dispensing roller and the winder, the cutting wheel including a plurality of blades projecting outward from an outer surface of the cutting wheel to perforate the carbon fiber substrate material as the carbon fiber substrate material moves past the cylindrical cutting wheel from the roll to the spool; and
- a cylindrical retention roller removably positioned between the first side support and the second side support in a first vertical slot in the first side support and in a second vertical slot in the second side support, the retention roller configured to contact a top of the roll of carbon fiber substrate material to limit movement of the roll of carbon fiber substrate material relative to the support structure.

14. The apparatus of claim 13 wherein the support structure further includes a rear cross-member and a top support, the rear cross-member and the top support horizontally connected between the first side support and the second side support.

15. The apparatus of claim 13 further comprising:
- an anvil connected to the support structure between the first side support and the second side support; and
- a drive assembly configured to rotate the anvil to move the carbon fiber substrate material, the drive assembly including a motor, a first gear, a second gear and a chain, the first gear rotatably connected to the motor, the second gear connected to the anvil, the chain mechanically coupling the first gear to the second gear whereby rotation of the motor causes the anvil to rotate.

16. The apparatus of claim 13 comprising:
- at least two dispensing rollers positioned parallel to one another below the cutting wheel and the winder.

17. The apparatus of claim 13 wherein the first side support and the second side support are separated by at least 24 inches to permit a roll of carbon fiber substrate material with a width of 24 inches to be received therein.

18. The apparatus of claim 13 wherein the cutting wheel is removably connected to the support structure between the first side support and the second side support.

* * * * *